US006528572B1

(12) United States Patent
Patel et al.

(10) Patent No.: US 6,528,572 B1
(45) Date of Patent: Mar. 4, 2003

(54) CONDUCTIVE POLYMER COMPOSITIONS AND METHODS OF MANUFACTURE THEREOF

(75) Inventors: Niraj C. Patel, Stamford, CT (US); Kim G. Balfour, Delanson, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/682,528

(22) Filed: Sep. 14, 2001

(51) Int. Cl.[7] ................................................. C08K 3/04
(52) U.S. Cl. ....................... 524/495; 524/439; 524/440; 524/441
(58) Field of Search ................................ 524/495, 439, 524/440, 441

(56) References Cited

U.S. PATENT DOCUMENTS

| | | | |
|---|---|---|---|
| 4,115,475 A | 9/1978 | Foy et al. .............. | 260/857 PE |
| 4,195,015 A | 3/1980 | Deleens et al. ........ | 260/45.75 C |
| 4,230,838 A | 10/1980 | Foy et al. ................... | 525/408 |
| 4,331,786 A | 5/1982 | Foy et al. ................... | 525/408 |
| 4,332,920 A | 6/1982 | Foy et al. ................... | 525/408 |
| 4,559,164 A | 12/1985 | Kostelnik et al. ........... | 252/511 |
| 4,565,684 A | 1/1986 | Tibbetts et al. .......... | 423/447.3 |
| 4,572,813 A | 2/1986 | Arakawa ................... | 264/29.2 |
| 4,637,945 A * | 1/1987 | Masui ......................... | 428/35 |
| 4,663,230 A | 5/1987 | Tennent ...................... | 428/367 |
| 4,816,289 A | 3/1989 | Komatsu et al. .......... | 423/447.3 |
| 4,839,441 A | 6/1989 | Cuzin et al. ................. | 528/328 |
| 4,864,014 A | 9/1989 | Cuzin et al. ................. | 528/279 |
| 4,871,613 A * | 10/1989 | Akao .......................... | 428/328 |
| 4,876,078 A | 10/1989 | Arakawa et al. .......... | 423/447.3 |
| 5,004,561 A | 4/1991 | Nomura et al. ............. | 252/511 |
| 5,024,818 A | 6/1991 | Tibbetts et al. ............. | 422/158 |
| 5,159,053 A | 10/1992 | Kolycheck et al. ........... | 528/76 |
| 5,165,909 A | 11/1992 | Tennent et al. .......... | 423/447.3 |
| 5,171,761 A * | 12/1992 | Penco ........................ | 522/141 |
| 5,589,152 A | 12/1996 | Tennent et al. .......... | 423/447.3 |
| 5,591,312 A | 1/1997 | Smalley ................. | 204/157.41 |
| 5,591,382 A | 1/1997 | Nahass et al. ............... | 252/511 |
| 5,591,832 A | 1/1997 | Koshijima et al. .......... | 530/500 |
| 5,604,284 A | 2/1997 | Ueda et al. .................. | 524/434 |
| 5,641,455 A | 6/1997 | Rosenlund et al. ........... | 422/28 |
| 5,652,326 A | 7/1997 | Ueda et al. .................. | 528/288 |
| 5,718,995 A * | 2/1998 | Eichorst ....................... | 430/39 |
| 5,830,326 A | 11/1998 | Iijima ......................... | 204/173 |
| 5,840,807 A | 11/1998 | Frey et al. ................... | 525/178 |
| 5,863,466 A | 1/1999 | Mor ............................ | 252/500 |
| 5,886,098 A | 3/1999 | Ueda et al. .................... | 525/66 |
| 5,919,429 A | 7/1999 | Tanaka et al. .......... | 423/445 B |
| 6,183,714 B1 | 2/2001 | Smalley et al. .......... | 423/447.3 |
| 6,376,057 B1 * | 4/2002 | Akao .......................... | 428/215 |

* cited by examiner

Primary Examiner—Edward J. Cain

(57) ABSTRACT

A composition comprising polymeric resin, electrically conductive filler and antistatic agents is disclosed. Electromagnetic shielding, electrostatic dissipation or antistatic capabilities can be imparted to articles made from the composition depending upon the amounts of the electrically conductive filler and antistatic agent present.

41 Claims, No Drawings

CONDUCTIVE POLYMER COMPOSITIONS AND METHODS OF MANUFACTURE THEREOF

BACKGROUND OF THE INVENTION

This disclosure relates to conductive polymeric resin compositions.

Articles made from thermoplastic resins are commonly utilized in material-handling and electronic devices such as packaging, chip carriers, printers and photocopier components where electrostatic dissipation is an important requirement. Electrostatic dissipation (hereinafter ESD) is defined as a transfer of electrostatic charge between bodies at different potentials caused by direct contact or induced by an electrostatic field. As electronic devices become smaller and faster, their sensitivity to static discharge increases and the necessity for increased rates of ESD becomes vital.

Conductive fillers such as carbon and graphite fibers are often incorporated into polymeric resins to modify the electrical properties and achieve ESD. The ESD provided by carbon and graphite fiber filled resins is very rapid. However, because of their macroscopic nature, the dissipation of charge is usually not complete. Localized residual charges in excess of 10 volts are generally observed, which can be harmful to electronic devices.

There accordingly remains a need in the art for conductive thermoplastic composition s having rapid ESD, together with more-complete dissipation of electrostatic change.

SUMMARY OF THE INVENTION

A conductive resin composition comprises a polymeric resin; an electrically conductive filler; and an antistatic agent. Such conductive compositions have good electrostatic dissipation properties, i.e.; residual surface voltage of less than about 5 volts, when measured about 8 seconds after application of a charge greater than about 1000 volts. Such compositions can be manufactured using conventional processing techniques and are capable of rapidly dissipating large amounts of surface charge.

DETAILED DESCRIPTION

When conductive fillers such as carbon fibers or carbon black are combined with antistatic agents in polymeric resins, the resulting composition displays an ability to rapidly dissipate any surface charge or voltage. Localized residual charges are also reduced to very low levels of less than 5 volts. The synergistic interaction between carbon fibers or carbon black and antistatic agents also allow for reductions in the quantities of these conductive components, thereby reducing material and production costs.

The polymeric resin used in the conductive compositions may be selected from a wide variety of thermoplastic resins and elastomers, blend of thermoplastic resins, or thermosetting resins. Specific non-limiting examples of thermoplastic resins include polyacetal, polyacrylic, styrene acrylonitrile, acrylonitrile-butadiene-styrene (ABS), polycarbonates, polystyrenes, polyethylene, polypropylenes, polyethylene terephthalate, polybutylene terephthalate, nylons (nylon 6, nylon 6,6, nylon 6,10, nylon 6,12, nylon 11 or nylon 12), polyamideimides, polyarylates, polyurethanes, ethylene propylene diene rubber(EPR), ethylene propylene diene monomer (EPDM), polyarylsulfone, polyethersulfone, polyphenylene sulfide, polyvinyl chloride, polysulfone, polyetherimide, polytetrafluoroethylene, fluorinated ethylene propylene, perfluoroalkoxy, polychlorotrifluoroethylene, polyvinylidene fluoride, polyvinyl fluoride, polyetherketone, polyether etherketone, polyether ketone ketone, and mixtures comprising any one of the foregoing thermoplastic resins.

Specific non-limiting examples of blends of thermoplastic resins include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyethylene/nylon, polyethylene/polyacetal, and mixtures comprising any one of the foregoing blends of thermoplastic resins.

Specific non-limiting examples of polymeric thermosetting materials include polyurethanes, natural rubber, synthetic rubber, epoxy, phenolic, polyesters, polyamides, silicones, and mixtures comprising any one of the foregoing thermosetting resins. Blends of thermosetting resins, as well as blends of thermoplastic resins with thermosetting resins can also be utilized.

The polymeric resin or resin blend is generally used in amounts greater than or equal to about 10 weight percent (wt %), preferably greater or equal to about 30 wt %, more preferably greater than or equal to about 40 wt % of the total composition. The polymeric resins are furthermore generally used in amounts less than or equal to about 99 weight percent wt %, preferably less than or equal to about 85 wt %, more preferably less than or equal to about 55 wt % of the total weight of the composition.

The carbon fibers employed in the conductive compositions may be a conductive carbon fiber that is known for use in modifying the ESD properties of polymeric resins. Various types of conductive carbon fibers known in the art, and are classified according to their diameter, morphology, and degree of graphitization (morphology and degree of graphitization being interrelated) may also be used. For example, carbon fibers having diameters down to about 3 micrometers, graphene ribbons parallel to the fiber axis (in radial, planar, or circumferential arrangements) and produced commercially by pyrolysis of organic precursors such as phenolics, polyacrylonitrile (PAN), or pitch may be used. The carbon fibers are generally chopped having an initial length (before compounding) from about (0.1 to about 2.0 inches.) Unchopped carbon fibers may also be used. Fibers may be sized or unsized. Sized fibers are conventionally coated on at least a portion of their surfaces with a sizing composition selected for compatibility with the polymeric thermoplastic matrix material. The sizing composition facilitates wet-out and wet-through of the matrix material upon the fiber strands and assists attaining desired physical properties in the composite. Such fibers are sold under a variety of trade names, including but not limited to Fortafil CA and Fortafil CM available from Fortafil Fibers, Inc., Zoltek HT available from Zoltek Corporation, Toray available from Toray Industries Inc., and Grafil available from Mitsubishi.

Carbon fibers are generally used in amounts greater than or equal to about 2 wt %, preferably greater or equal to about 4 wt %, more preferably greater than or equal to about 6 wt % of the total composition. The carbon fibers are furthermore generally used in amounts less than or equal to about 40 wt %, preferably less than or equal to about 25 wt %, more preferably less than or equal to about 10 wt % of the total weight of the composition Small graphitic or partially graphitic carbon fibers, also referred to as vapor grown carbon fibers (VGCF), having diameters of about 3.5 to about 500 nanometers (nm) and an aspect ratio greater than or equal to about 5 may be used. When VGCF are used, diameters of about 3.5 to about 70 nm are preferred, with diameters of about 3.5 to about 50 nm being more preferred. It is also preferable to h ave average aspect ratios greater than or equal to about 100 and more preferably greater than or equal to about 1000. Representative VGCF are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

VGCF are generally used in amounts greater than or equal to about 0.25 wt %, preferably greater or equal to about 0.5 wt %, more preferably greater than or equal to about 1 wt % of the total composition. VGCF are furthermore generally used in amounts less than or equal to about 30 wt %, preferably less than or equal to about 10 wt %, more preferably less than or equal to about 5 wt % of the total weight of the composition.

Carbon nanotubes produced by laser-evaporation of graphite or carbon arc synthesis may also be used. Nanotubes may consist of a single wall, wherein the tube diameter is about 0.7 to about 2.4 nm, or have multiple, concentrically-arranged walls wherein the tube diameter is from about 2 to about 50 nm. When carbon nanotubes are used it is preferred to have an average aspect ratio greater than or equal to about 5, preferably greater than or equal to about 100, more preferably greater than or equal to about 1000. Representative carbon nanotubes are described in U.S. Pat. No. 6,183,714 to Smalley et al., U.S. Pat. No. 5,591,312 to Smalley, U.S. Pat. No. 5,641,455 to Ebbesen et al., 5,830,326 to Iijima et al., U.S. Pat. No. 5,591,832 to Tanaka et al., and U.S. Pat. No. 5,919,429 to Tanaka et al.

Carbon nanotubes are generally used in amounts greater than or equal to about 0.025 wt %, preferably greater or equal to about 0.05 wt %, more preferably greater than or equal to about 0.1 wt % of the total composition. Carbon nanotubes are furthermore generally used in amounts less than or equal to about 30 wt %, preferably less than or equal to about 10 wt %, more preferably less than or equal to about 5 wt % of the total weight of the composition.

Carbon black may also be used, preferred carbon blacks are those having average particle sizes less than about 200 nm, preferably less than about 100 nm, more preferably less than about 50 nm. Preferred conductive carbon blacks may also have surface areas greater than about 200 square meter per gram ($m^2/g$), preferably greater than about 400 $m^2/g$, yet more preferably greater than about 1000 $m^2/g$. Preferred conductive carbon blacks may have a pore volume (dibutyl phthalate absorption) greater than about 40 cubic centimeters per hundred grams ($cm^3/100$ g), preferably greater than about 100 $cm^3/100$ g, more preferably greater than about 150 $cm^3/100$ g. Exemplary carbon blacks include the carbon black commercially available from Columbian Chemicals under the trade name Conductex® the acetylene black available from Chevron Chemical, under the trade names S.C.F. (Super Conductive Furnace) and E.C.F. (Electric Conductive Furnace); the carbon blacks available from Cabot Corp. under the trade names Vulcan XC72 and Black Pearls; and the carbon blacks commercially available from Akzo Co. Ltd under the trade names Ketjen Black EC 300 and EC 600. Preferred conductive carbon blacks may be used in amounts from about 2 wt % to about 25 wt % based on the total weight of the composition.

Solid conductive metallic fillers may also be used in the conductive compositions. These may be electrically conductive metals or alloys that do not melt under conditions used in incorporating them into the polymeric resin, and fabricating finished articles therefrom. Metals such as aluminum, copper, magnesium, chromium, tin, nickel, silver, iron, titanium, and mixtures comprising any one of the foregoing metals can be incorporated into the polymeric resin as conductive fillers. Physical mixtures and true alloys such as stainless steels, bronzes, and the like, can also serve as conductive filler particles. In addition, a few intermetallic chemical compounds such as borides, carbides, and the like, of these metals, (e.g., titanium diboride) can also serve as conductive filler particles. Solid non-metallic, conductive filler particles such as tin-oxide, indium tin oxide, and the like may also be added to render the polymeric resin conductive. The solid metallic and non-metallic conductive fillers may exist in the form of powder, drawn wires, strands, fibers, tubes, nanotubes, flakes, laminates, platelets, ellipsoids, discs, and other commercially available geometries commonly known in the art.

Regardless of the exact size, shape and composition of said solid metallic and non-metallic conductive filler particles, they may be dispersed into the polymeric resin at loadings greater than or equal to about 1 wt %, preferably greater than or equal to about 1.5 wt % and more preferably greater than or equal to about 2 wt % of the total composition. The loadings of said solid metallic and non-metallic conductive filler particles may be less than or equal to 50 wt %, preferably less than or equal to about 45 wt %, more preferably less than or equal to about 40 wt % of the total composition.

Non-conductive, non-metallic fillers that have been coated over a substantial portion of their surface with a coherent layer of solid conductive metal may also be used in the conductive compositions. The non-conductive, non-metallic fillers are commonly referred to as substrates, and substrates coated with a layer of solid conductive metal may be referred to as "metal coated fillers". Typical conductive metals such as aluminum, copper, magnesium, chromium, tin, nickel, silver, iron, titanium, and mixtures comprising any one of the foregoing metals may be used to coat the substrates. Examples of substrates are well known in the art and include those described in "Plastic Additives Handbook, $5^{th}$ Edition" Hans Zweifel, Ed, Carl Hanser Verlag Publishers, Munich, 2001. Non-limiting examples of such substrates include silica powder, such as fused silica and crystalline silica, boron-nitride powder, boron-silicate powders, alumina, magnesium oxide (or magnesia), wollastonite, including surface-treated wollastonite, calcium sulfate (as its anhydride, dihydrate or trihydrate), calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, and kaolin comprising various coatings known in the art to facilitate compatibility with the polymeric matrix resin, mica, feldspar, silicate spheres, flue dust, cenospheres, finite, aluminosilicate (armospheres), natural silica sand, quartz, quartzite, perlite, tripoli, diatomaceous earth, synthetic silica, and mixtures comprising any one of the foregoing. All of the above substrates may be coated with a layer of metallic material for use in the conductive compositions.

Other commonly used non-conductive mineral fillers such as silicon carbide, molybdenum sulfide, zinc sulfide, aluminum silicate (mullite), synthetic calcium silicate, zirconium silicate, barium titanate, barium ferrite, barium sulfate, and flaked fillers such as glass flakes, flaked silicon carbide, aluminum diboride, may also be used as substrates for conductive metallic coatings. Fibrous fillers such as aluminum silicates, aluminum oxides, magnesium oxides, and calcium sulfate hemihydrate may also be coated with conductive metallic coatings and used in the conductive compositions. Other fibrous fillers which may be used as substrates for conductive metallic coatings include natural fillers and reinforcements, such as wood flour obtained by pulverizing wood, and fibrous products such as cellulose, cotton, sisal, jute, starch, cork flour, lignin, ground nut shells, corn, rice grain husks, and the like. Also included among fibrous fillers that can be used as substrates for conductive metallic coatings are single crystal fibers or "whiskers" including silicon carbide, alumina, boron carbide, and mixtures comprising any one of the foregoing. Glass fibers, including textile glass fibers such as E, A, C, ECR, R, S, D, and NE glasses and quartz, and the like, may also be coated with a conductive metallic coating and used in the conductive composition.

Organic reinforcing fibrous fillers which can be used as substrates for conductive metallic coatings include fibers obtained from organic polymers such as poly(ether ketone), polyimide, polybenzoxazole, poly(phenylene sulfide), polyesters, polyethylene, aromatic polyamides, aromatic polyimides or polyetherimides, polytetrafluoroethylene, acrylic resins, poly(vinyl alcohol), and other polymers commonly known in the art. Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures that can be used as substrates include glass fiber-carbon fiber, carbon fiber-aromatic polyimide (aramid) fiber, and aromatic polyimide fiberglass fiber. Fibrous fillers to be used as substrates for conductive metallic coatings may be supplied in the form of, for example, rovings, woven fibrous reinforcements, such as 0–90 degree fabrics, non-woven fibrous reinforcements such as continuous strand mat, chopped strand mat, tissues, papers and felts and 3-dimensional woven reinforcements, performs, braids, and mixtures comprising any one of the foregoing.

Regardless of the exact size, shape and composition of said substrates, they are coated with a solid layer of conductive metal covering from about 5% of the surface area to 100% of the surface area. The surface area is typically determined by commonly known methods such as BET nitrogen adsorption or mercury porosimetry. The metal coated fillers may be dispersed through the polymeric resin at loadings greater than or equal to about 1 wt %, preferably greater than or equal to about 1.5 wt % and more preferably greater than or equal to about 2 wt % of the total composition. The loadings of said solid metallic and non-metallic conductive fillers particles may be less than or equal to about 50 wt %, preferably less than or equal to about 45 wt %, more preferably less than or equal to about 40 wt % of the total composition.

In one embodiment carbon fibers, VGCF, carbon nanotubes, carbon black, conductive metal fillers, conductive non-metal fillers, metal coated substrates as detailed above, or any combination of the foregoing may be used in a polymeric resin containing antistatic agents to render the composition electrostatically dissipative. The preferred electrically conductive filler is carbon fiber.

The term "antistatic agent" refers to several materials known in the art that can be either melt-processed into polymeric resins or sprayed onto commercially available polymeric forms and shapes to improve conductive properties and overall physical performance. Examples of monomeric antistatic agents that may be used are glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, quaternary ammonium salts, quaternary ammonium resins, imidazoline derivatives, sorbitan esters, ethanolamides, betaines, and mixtures of the foregoing. Non-limiting examples of commercial monomeric antistatic agents which may be used in polymeric resins are Pationic 1042 and Pationic AS10 available from Patco or Statexan® K1 available from Bayer.

Other examples of polymeric antistatic agents are the copolyesteramides as disclosed in U.S. Pat. No. 4,115,475 to Foy et al., U.S. Pat. Nos. 4,839,441 and 4,864,014 to Cuzin et al., polyether-polyamide block copolymers as disclosed in U.S. Pat. No. 5,840,807 to Frey et al., polyetheresteramide block copolymers disclosed in U.S. Pat. Nos. 5,604,284; 5,652,326; and 5,886,098 to Ueda et al., U.S. Pat. Nos. 4,331,786; 4,230,838; 4,332,920 to Foy et al., and U.S. Pat. No. 4,195,015 to Deleens et al., polyurethane containing a polyalkylene glycol moiety as disclosed in U.S. Pat. No. 5,159,053 to Kolycheck et al., and U.S. Pat. No. 5,863,466 to Mor et al. Polymeric antistatic agents have been shown to be fairly thermally stable and readily processable in the melt state in their neat form or in blends with other polymeric resins. Most of the known, inherently conducting polymers such as polyaniline, polypyrrole and polythiophene, which retain some of their intrinsic conductivity after melt processing at elevated temperatures, can also be used. Polymeric antistatic agents such as Pelestat 6321 available from Sanyo or Hostastat available from Clariant are non-limiting examples of polymeric antistatic agents that may be added to polymeric resins to improve conductive properties.

In one embodiment, monomeric antistatic agents, polymeric antistatic agents, inherently conductive polymers, or mixtures comprising any one of the foregoing may be used in the conductive compositions. The preferred antistatic agents are polymeric antistatic agents. Chemical antistatic agents are generally used in amounts greater than or equal to about 0.01 wt %, preferably greater or equal to about 0.1 wt %, more preferably greater than or equal to about 1 wt % of the total composition. The chemical antistatic agents are furthermore generally used in amounts less than or equal to about 25 wt %, preferably less than or equal to about 15 wt %, more preferably less than or equal to about 10 wt % of the total weight of the composition.

In addition, the conductive compositions may include additional ingredients consistent with standard practices in the art. The compositions may include additional fibers such as glass fibers, mica, and the like. Minor amounts of other materials can also be included to modify specific properties of the composition. For example, polytetrafluoroethylene (PTFE) in amounts of up to about 1 wt % could be included as part of a flame retardant package. Other types of flame retardant packages including brominated flame retardant polymers (e.g. brominated PC) or phosphorus-containing organic flame retardants (such as resorcinol diphosphate, bisphenol A diphosphate or tetraxylyl piperazine diphosphamide) can also be included in effective amounts up to about 20 wt %. PTFE can also be included in larger amounts, up to about 25 wt %, to improve wear resistance; and polyethylene or polyethylene propylene glycol can be included in amounts up to about 2 wt % to improve mold release characteristics. Impact modifiers such as styrene-butadiene-styrene (SBS) can be included in amounts up to about 10 wt % to further improve impact strength. Flow promoters such as hydrogenated polyterpene can also be included in amounts up to about 10 wt %. Appropriate stabilizers and antioxidants can also be included. All of the above mentioned additives have their percent weights based on total resin composition.

Compounding of the polymeric resin, electrically conductive filler, antistatic agent and any other additives to form the conductive resin composition may be carried out in an extruder, roll mill or any other apparatus suitable for yielding a substantially uniform mixture. The addition of electrically conductive filler and antistatic agents to the extruder for incorporation into the polymeric resin may be sequential (in either order) or concurrent. Further, it is also possible to predisperse the electrically conductive filler and the antistatic agent in a single masterbatch or separate masterbatches respectively which are fed to the extruder along with additional polymeric resin to yield the desired final conductive resin composition. Such masterbatches may be fed to the extruder sequentially (in either order) or concurrently. Masterbatching generally allows for better dispersion of the electrically conductive filler and the antistatic agents in the polymeric resin. The extruded conductive resin may then be molded into a final shape by injection molding, blow molding and the like.

In a preferred embodiment, in one manner of proceeding, a polymeric resin in powder form such as acrylonitrilebutadiene-styrene (ABS) of about 77 wt % is first mixed with about 8 wt % of an antistatic agent such as Pelestat 6321 in a Henschel mixer for a period of two minutes to obtain an intimate mixture. The mixture is fed into a 30 mm twin screw extruder having ten barrels (heating zones) set at temperatures of 180° C., 200° C., 220° C., 240° C., 240° C., 240° C., 240° C., 240° C., and 240° C. from the throat of the extruder to the die respectively. The extruder is operated at 400 revolutions per minute (rpm) and the carbon fibers are fed into the extruder through barrel no. 7 via a side feeder in an amount of about 15 wt %. The conductive resin strand emerging from the extruder is immediately cooled in a water bath, pelletized and subjected to a forming process such as injection molding or blow molding.

Conductive resins produced from the above compositions display some significant advantages over conventional compositions. Depending upon the amount of the electrically conductive filler and antistatic agent present, compositions can provide electromagnetic shielding, electrostatic dissipation or antistatic capabilities to articles made from them. Because of their ability to rapidly dissipate static charges, dust pick-up, which can ruin clarity and/or the sales appeal of items packaged in plastics is minimized. Electrical discharges that can start a fire, cause an explosion or give electrical shocks to employees are minimized. In addition damage of sensitive electrical components for computers, photocopiers and the like are reduced when such compositions are employed in packaging applications.

The invention is further illustrated by the following non-limiting examples.

EXAMPLE 1

Table 1 shows the compositions for 11 test mixes that were prepared to evaluate and compare the performance of conventional conductive resin compositions containing either carbon fibers (compositions 2, 3, 7 or 8) or antistatic agents (compositions 1 and 6) with resin compositions containing both carbon fibers and antistatic agents (compositions 4, 5, 10 and 11). For compositions 1 to 5, a developmental acrylonitrile-butadiene-styrene (GE Plastics) was used as the polymeric resin, while for compositions 6 to 11, Noryl PXW20, a commercially available polyphenylene ether-high impact polystyrene (PPE/HIPS) resin from GE Plastics was used. Pelestat 6321, a polyamide-ether-ester was used as the antistatic agent and Fortafil 202 carbon fibers were utilized.

TABLE 1

| | Composition | | | | | | | | | | |
|---|---|---|---|---|---|---|---|---|---|---|---|
| | 1 | 2 | 3 | 4 | 5 | 6 | 7 | 8 | 9 | 10 | 11 |
| Bulk-ABS (wt %) | 92% | 85% | 75% | 77% | 76% | — | — | — | — | — | — |
| PPE/HIPS Resin (Noryl PXW20) (wt %) | — | — | — | — | — | 92% | 85% | 80% | 75% | 77% | 76% |
| Polyetheresteramide antistatic agent (Pelestat 6321) (wt %) | 8% | — | — | 8% | 4% | 8% | — | — | — | 8% | 4% |
| Chopped carbon fibers (Fortafil 202) (wt %) | — | 15% | 25% | 15% | 20% | — | 15% | 20% | 25% | 15% | 20% |

The polymeric resin was first blended with the antistatic agent in a Henschel high-speed mixer for two minutes and then fed at the throat into a 30 mm Werner and Pfleiderer twin-screw extruder having 10 barrels. Zone temperatures were adjusted to be 200° C., 220° C., 230° C., 240° C., 240° C., 240° C., 240° C., 240° C., 240° C., and 240° C. Die temperature was maintained at 240° C. Carbon fibers were fed through a side feeder at barrel # 7. The extruded conductive strand was immediately quenched using a water bath and pelletized. From the resulting pellets, ten plaques (6 inches×8 inches×0.125 inches) from each composition were molded on a 120 ton VanDorn injection molding machine.

For measuring surface resistivity, each plaque was placed on a grounded work surface and verified to have no electrostatic surface charge using an electrostatic voltmeter (TREK Electrostatic Voltmeter Model 520). Then, an electrostatic gun (Milty ZEROSTAT 3) was used to apply positively charged ions to the plaque surface resulting in an electrostatic charge build-up in excess of 2000 V. Immediately after application of the electrostatic charge, the electrostatic voltmeter was again used to measure the surface voltage present on the plaques. Surface voltage readings were taken in 20 different locations per plaque, arranged in a 4×5 grid. The average, standard deviation and maximum and minimum values measured are set forth in Table 2. These values reflect the occurrence of localized residual charge or voltage, particularly in plaques formed with only carbon fibers or only antistatic agent. In contrast, the plaques made using compositions in accordance with the invention show lower residual voltage and more uniform distribution of charge.

VanDorn injection molding machine. In addition ASTM Type I tensile specimens (dogbones) were molded to measure the volume resistivity.

Surface resistivity was measured as described above. Immediately after application of the electrostatic charge, the electrostatic voltmeter was used to again measure the surface voltage present on the plaques. In order to measure the volume resistivity, the surface of the dogbone tensile specimens was scored 2.5 inches apart using a sharp blade to create stress concentrators. The samples were then fractured under liquid nitrogen at these points, and the fractured surface was then coated with conductive silver paint. When the silver paint completely dried, volume resistivity measurements were made using a standard voltmeter.

TABLE 2

| | Composition | | | | | | | | | | |
|---|---|---|---|---|---|---|---|---|---|---|---|
| | 1 | 2 | 3 | 4 | 5 | 6 | 7 | 8 | 9 | 10 | 11 |
| Average Residual Voltage (volts) | 308 | 52.4 | 31.3 | 0.79 | 8.9 | 207 | 48.5 | 22.5 | 19 | 0.54 | 3.7 |
| Standard Deviation | 127 | 32 | 16.8 | 0.46 | 5.4 | 89.5 | 14.5 | 10.6 | 7.1 | 0.55 | 2.6 |
| Maximum Voltage (volts) | 700 | 210 | 80 | 2 | 28 | 550 | 105 | 80 | 49 | 1 | 17 |
| Minimum Voltage (volts) | 75 | 5 | 4 | 0 | 1 | 90 | 15 | 4 | 6 | 0 | 1 |

The data shown in Table 2 reflects measurements taken at 20 different locations on the surface of an injected molded test plaque. Thus, while a low average reading is desirable, a low standard deviation is also desirable, as this reflects the absence of localized charged regions. As shown in Table 2, these criteria are only met when both carbon fibers and antistatic agent are present. When the antistatic agent alone is used, i.e., in composition 1 or 6, both the residual voltage and the standard deviation are large. When carbon fibers alone are present, for example as in composition 2, 3, 7 and 8 the residual voltage is less, but the standard deviation is still significant. When the two materials are used in combination, i.e. in compositions 4, 5, 10 and 11, the results are far superior, with both the average residual voltage and the standard deviation being low.

EXAMPLE 2

In this example, the polymeric resin is a blend of polyphenylene ether (PPE) (General Electric Company) having an intrinsic viscosity of 0.4 dl/g and polystyrene (PS) (commercially available as Crystal Novacor 2272-300 from Nova Chemical company) mixed in a ratio of 4:1 by weight. Table 3 reflects surface and volume resistivity measurements made on PPE/PS blends containing only carbon fibers obtained from Zoltek. Tables 5 and 6 reflect the surface and volume resistivity results obtained when both carbon fibers and antistatic agents are used.

The polymeric resin was first blended with or without the antistatic agent as dictated by the composition in a Henschel high-speed mixer for two minutes and then fed at the throat into a 30 mm Werner and Pfleiderer twin-screw extruder having 10 barrels. Zone temperatures were adjusted to be 200° C., 250° C., 270° C., 290° C., 290° C., 290° C., 290° C., 290° C., 290° C and 290° C. Die temperature was maintained at 290° C. Carbon fibers were fed through a side feeder at barrel # 7. The extruded strand was immediately quenched using a water bath and pelletized. From the resulting pellets, ten plaques (6 inches×8 inches×0.125 inches) from each composition were molded on a 120 ton

TABLE 3

| Composition | 1 | 2 | 3 |
|---|---|---|---|
| Polyphenylene Ether (wt %) | 76 | 75.2 | 74.4 |
| Crystal Polystyrene Novacor 2272-300 (wt %) | 19 | 18.8 | 18.6 |
| Zoltek Carbon Fibers (wt %) | 5 | 6 | 7 |
| Pellestat 7530 (wt %) | | | |
| Hostastat (wt %) | | | |
| Surface Resistivity (ohm/sq) | 3.10E+13 | 3.40E+06 | 3.00E+05 |
| Volume Resistivity (ohm-cm) | Insulator | Insulator | 241 |

It can clearly be seen from the compositions in Table 3 that both the surface and volume resistivity decrease with increasing carbon fiber content.

EXAMPLE 3

Example 3 contains the same ingredients used in example 2 except for the additional use of the antistatic agent Pelestat 7530 as shown in table 4.

TABLE 4

| Composition | 1 | 2 | 3 | 4 | 5 |
|---|---|---|---|---|---|
| Polyphenylene Ether (wt %) | 72.8 | 72 | 71.2 | 70.4 | 69.6 |
| Crystal Polystyrene Novacor | 18.2 | 18 | 17.8 | 17.6 | 17.4 |

TABLE 4-continued

| Composition | 1 | 2 | 3 | 4 | 5 |
|---|---|---|---|---|---|
| 2272-300 (wt %) | | | | | |
| Zoltek Carbon | 5 | 6 | 7 | 6 | 7 |
| Fibers (wt %) | | | | | |
| Pelestat 7530 (wt %) | 4 | 4 | 4 | 6 | 6 |
| Hostastat (wt %) | | | | | |
| Surface Resistivity (ohm/sq) | 3.20E+16 | 1.30E+05 | 1.10E+04 | 5.60E+04 | 1.30E+04 |
| Volume Resistivity (ohm-cm) | Insulator | 6.30E+16 | 34 | 1373 | 81 |

Pelestat 7530 is a polyetheresteramide block copolymer obtained from Sanyo Chemical Industries Ltd and is added in amounts ranging from 4 to 6 wt %. It is typically added to the polymer blend before high speed mixing in the Henschel and the mixture is subsequently fed into the extruder as in example 2. Injection molded plaques and dogbone tensile specimens were tested in a manner similar to that described above. A comparison of results from compositions 1, 2 and 3 in example 2 with compositions 1, 2, and 3 in example 3 clearly shows that the addition of a small amount of the antistatic agent to the polymeric resin containing carbon fibers significantly improves the conductive properties (i.e. surface and volume resistivity decrease).

EXAMPLE 4

Example 4 contains the same ingredients used in example 3 except for the substitution of Hostastat for Pelestat as the antistatic agent. Table 5 quite clearly shows that as the weight percent of the conductive component (carbon fibers and antistatic agent) increases the surface and volume resistivity decreases. Further a comparison of conductive properties of compositions 1, 2 and 3 from example 4 with compositions 1, 2 and 3 from example 2 again shows that the addition of the antistatic agent to the polymeric composition containing carbon fibers produces superior electrical properties.

TABLE 5

| | Composition | | | | | | | |
|---|---|---|---|---|---|---|---|---|
| | 1 | 2 | 3 | 4 | 5 | 6 | 7 | 8 |
| Polyphenylene Ether (wt %) | 75.2 | 74.4 | 73.6 | 74.4 | 73.6 | 72.8 | 72.8 | 72 |
| Crystal Polystyrene Novacor 2272-300 (wt %) | 18.8 | 18.6 | 18.4 | 18.6 | 18.4 | 18.2 | 18.2 | 18 |
| Zoltek Carbon Fibers (wt %) | 5 | 6 | 7 | 5 | 6 | 7 | 6 | 7 |
| Pellestat 7530 (wt %) | | | | | | | | |
| Hostastat (wt %) | 1 | 1 | 1 | 2 | 2 | 2 | 3 | 3 |
| Surface Resistivity (ohm/sq) | 7.40E+05 | 5.70E+04 | 1.40E+04 | 5.30E+04 | 3.20E+04 | 1.60E+04 | 4.20E+04 | 5.70E+03 |
| Volume Resistivity (ohm-cm) | 6.30E+16 | 3.36E+02 | 27 | 825 | 164 | 51 | 193 | 15 |

All patents cited herein are incorporated by reference.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A conductive resin composition comprising:
   a polymeric resin;
   an electrically conductive filler; and
   an antistatic agent, wherein the antistatic agent is a block copolymer.

2. The composition of claim 1, wherein the polymeric resin is a thermoplastic resin selected from the group consisting of polyacetal, polyacrylic, styrene acrylonitrile, acrylonitrile-butadiene-styrene, polycarbonates, polystyrenes, polyethylene, polypropylenes, polyethylene terephthalate, polybutylene terephthalate, nylon 6, nylon 6,6 nylon 6,10, nylon 6,12, nylon 11 or nylon12, polyamideimides, polyarylates, polyurethanes, ethylene propylene rubber, ethylene propylene diene monomer, polyarylsulfone, polyethersulfone, polyphenylene sulfide, polyvinyl chloride, polysulfone, polyetherimide, polytetrafluoroethylene, fluorinated ethylene propylene, perfluoroalkoxy, polychlorotrifluoroethylene, polyvinylidene fluoride, polyvinyl fluoride, polyetherketone, polyether etherketone, polyether ketone ketone, and mixtures comprising at least one of the foregoing thermoplastic resins.

3. The composition of claim 1, wherein the polymeric resin is a thermosetting resin selected from the group consisting of polyurethanes, natural rubber, synthetic rubber, epoxy, phenolic, polyesters, polyamides, silicones, and mixtures comprising at least one of the foregoing thermosetting resins.

4. The composition of claim 1, wherein the polymeric resin comprises a blend of a thermoplastic resin with a thermosetting resin.

5. The composition of claim 1, wherein the polymeric resin comprises about 10 to about 99 wt % of the total composition.

6. The composition of claim 1, wherein the polymeric resin comprises about 30 to about 85 wt % of the total composition.

7. The composition of claim 1, wherein the polymeric resin comprises about 40 to about 55 wt % of the total composition.

8. The composition of claim 1, wherein the electrically conductive filler is selected from the group consisting of carbon fibers, vapor grown carbon fibers, carbon nanotubes, carbon black, conductive metal fillers, conductive non-metal fillers, metal coated substrates, and mixtures comprising at least one of the foregoing electrically conductive fillers.

9. The composition of claim 8, wherein the carbon fibers comprise about 2 wt % to about 40 wt % of the total composition.

10. The composition of claim 8, wherein the carbon fibers comprise about 4 wt % to about 25 wt % of the total composition.

11. The composition of claim 8, wherein the carbon fibers comprise about 6 wt % to about 10 wt % of the total composition.

12. The composition of claim 8, wherein vapor grown carbon fibers comprise about 0.25 wt % to about 30 wt % of the total composition.

13. The composition of claim 8, wherein carbon nanotubes comprise about 0.025 wt % to about 30 wt % of the total composition.

14. The composition of claim 8, wherein carbon black comprises about 2 wt % to about 25 wt % of the total composition.

15. The composition of claim 8, wherein the conductive metal filler comprises about 1 wt % to about 40 wt % of the total composition.

16. The composition of claim 8, wherein the conductive non-metallic filler comprises about 1 wt % to about 40 wt % of the total composition.

17. The composition of claim 8, wherein the metal coated substrate filler comprises about 1 wt % to about 40 wt % of the total composition.

18. The composition of claim 1, wherein the antistatic agent is polymeric and is selected from the group consisting of copolyesteramides, polyether-polyamide block copolymers, polyetheresteramide block copolymers, polyurethane containing a polyalkylene glycol moiety and mixtures comprising at least one of the foregoing polymeric antistatic agents.

19. The composition of claim 1, wherein the antistatic agent comprises about 0.01 wt % to about 25 wt % of the total composition.

20. The composition of claim 1, wherein the antistatic agent comprises about 0.1 to about 15 wt % of the total composition.

21. The composition of claim 1, wherein the antistatic agent comprises about 1 to about 10 wt % of the total composition.

22. A conductive composition comprising:
a thermoplastic polymeric resin;
an electrically conductive carbon fiber; and
an antistatic agent, wherein the antistatic agent is a block copolymer.

23. A composition of claim 22, wherein the thermoplastic polymeric resin is selected from the group consisting of polycarbonate, polybutylene terephthalate, sulfonated polybutylene terephthalate, acrylonitrile-butadiene-styrene, styrene acrylonitrile, polystyrene, polypropylene, polydimethylsiloxane, polyphenylene ether, polyimide, polyetherimide, polysulfones, and mixtures comprising any one of the foregoing thermoplastic polymeric resins.

24. A composition of claim 22, wherein the electrically conductive carbon fiber is chopped and has an initial length of about 0.1 inch to about 2.0 inches.

25. A composition of claim 22, wherein the antistatic agent is a polyetheresteramide block copolymer.

26. An electrically conductive composition comprising:
an acrylonitrile-butadiene-styrene copolymer;
an electrically conductive carbon fiber; and
a polyetheresteramide copolymer.

27. A composition of claim 26, wherein the acrylonitrile-butadiene-styrene copolymer comprises about 10 to about 99 wt % of the total composition.

28. A composition of claim 26, wherein the conductive carbon fiber comprises about 2 to about 40 wt % of the total composition.

29. A composition of claim 26, wherein the polyetheresteramide copolymer is the antistatic agent and comprises about 0.01 to about 15 wt % of the total composition.

30. An electrically conductive composition comprising:
a thermoplastic blend of polyphenylene ether and high impact polystyrene;
an electrically conductive carbon fiber; and
an antistatic agent, wherein the antistatic agent is a block copolymer.

31. A composition of claim 30, wherein the thermoplastic blend of polyphenylene ether and high impact polystyrene comprises about 10 to about 99 wt % of the total composition.

32. A composition of claim 30, wherein the conductive carbon fiber comprises about 2 to about 40 wt % of the total composition.

33. A composition of claim 30, wherein the conductive carbon fiber is chopped and has an initial length of about 0.1 inch to about 2 inches and a diameter greater than about 3 microns.

34. A composition of claim 30, wherein the antistatic agent is selected from the group consisting of copolyesteramides, polyether-polyamide block copolymers, polyetheresteramide block copolymers, polyurethane containing a polyalkylene glycol moiety and mixtures comprising at least one of the foregoing antistatic agents.

35. A composition of claim 30, wherein the antistatic agent comprises about 0.01 to about 25 wt % of total composition.

36. An extruded conductive pellet formed from a composition comprising:
a thermoplastic polymeric resin;
an electrically conductive filler; and
an antistatic agent, wherein the antistatic agent is a block copolymer, and further wherein the filler and the antistatic agent are present in an amount effective to provide residual surface voltage of less than about 5 volts when measured 8 seconds after application of 1000 volts.

37. A composition of claim 36, wherein the electrically conductive filler is selected from the group consisting of carbon fibers, vapor grown carbon fibers, carbon nanotubes, carbon black, conductive metal fillers, conductive non-metal fillers, metal coated substrates, and mixtures comprising at least one of the foregoing electrically conductive fillers.

38. A composition of claim 36, wherein the antistatic agent is selected from the group consisting of copolyesteramides, polyether-polyamide block copolymers, polyetheresteramide block copolymers, polyurethane containing a polyalkylene glycol moiety and mixtures comprising at least one of the foregoing antistatic agents.

39. A composition of claim 36, wherein the polymeric resin comprises a blend of thermoplastic resins.

40. A conductive resin composition comprising a polymeric resin, carbon fibers and an antistatic agent, wherein the antistatic agent is a block copolymer, in amounts effective to provide the composition with a residual surface voltage of about 3 volts or less, when measured at a time of about 8 seconds after application of a charge in excess of about 1000 volts.

41. A method for manufacturing a conductive composition comprising:

compounding a polymeric resin, carbon fibers, and an antistatic agent, wherein the antistatic agent is a block copolymer, in an extruder;

quenching and pelletizing the extrudate; and injection molding said pelletized extrudate into a conductive article.

* * * * *